US009596300B2

(12) United States Patent
Riikonen

(10) Patent No.: US 9,596,300 B2
(45) Date of Patent: Mar. 14, 2017

(54) TECHNOLOGIES FOR PROCESSING DATA PACKETS IN BATCHES

(71) Applicant: Forcepoint Finland Oy, Helsinki (FI)

(72) Inventor: Pekka Riikonen, Helsinki (FI)

(73) Assignee: Forcepoint Finland Oy, Helsinki (FI)

( * ) Notice: Subject to any disclaimer, the term of this patent is extended or adjusted under 35 U.S.C. 154(b) by 115 days.

(21) Appl. No.: 14/174,361

(22) Filed: Feb. 6, 2014

(65) Prior Publication Data

US 2014/0237097 A1    Aug. 21, 2014

(30) Foreign Application Priority Data

Feb. 18, 2013    (EP) ..................................... 13155592

(51) Int. Cl.
| | |
|---|---|
| *G06F 15/173* | (2006.01) |
| *G06F 15/16* | (2006.01) |
| *H04L 29/08* | (2006.01) |
| *H04L 12/813* | (2013.01) |
| *H04L 12/801* | (2013.01) |
| *H04L 29/06* | (2006.01) |

(52) U.S. Cl.
CPC ............ *H04L 67/104* (2013.01); *H04L 47/10* (2013.01); *H04L 47/11* (2013.01); *H04L 47/20* (2013.01); *H04L 67/327* (2013.01); *H04L 69/22* (2013.01)

(58) Field of Classification Search
CPC ......... H04L 47/10; H04L 47/11; H04L 47/20; H04L 69/00; H04L 69/22
USPC ................. 709/223–226; 370/229, 230, 235; 718/101
See application file for complete search history.

(56) References Cited

U.S. PATENT DOCUMENTS

| | | | | |
|---|---|---|---|---|
| 5,566,170 | A * | 10/1996 | Bakke ..................... | H04L 29/06 370/392 |
| 7,546,629 | B2 * | 6/2009 | Albert ................. | H04L 12/2856 709/223 |
| 7,835,293 | B2 * | 11/2010 | Cidon ................. | H04L 12/2697 709/224 |
| 8,520,684 | B2 * | 8/2013 | Cavalli ................... | H04L 47/10 370/328 |
| 8,942,096 | B2 * | 1/2015 | Arvidsson ...................... | 370/235 |
| 9,049,144 | B2 * | 6/2015 | Bajpai ..................... | H04L 69/16 |
| 2005/0138528 | A1 * | 6/2005 | Ameigeiras ........... | H04L 1/1874 714/774 |

(Continued)

FOREIGN PATENT DOCUMENTS

| | | |
|---|---|---|
| EP | 2768200 | 8/2014 |
| WO | 0052904 A1 | 9/2000 |

OTHER PUBLICATIONS

Search Report for European Patent Application No. 13155592; Jul. 25, 2013.

(Continued)

*Primary Examiner* — Bharat N Barot
(74) *Attorney, Agent, or Firm* — Schwegman Lundberg & Woessner, P.A.

(57) ABSTRACT

At least one connection is defined between protocol entities hosted by network nodes in a packet data communication network. Data packets that include information identifying communicating protocol entities are received. The received data packets are stored into batches corresponding to the defined connections, on the basis of the information identifying communicating protocol entities.

19 Claims, 3 Drawing Sheets

(56) References Cited

U.S. PATENT DOCUMENTS

| 2007/0076605 A1* | 4/2007 | Cidon | H04L 12/2697 |
| | | | 370/230 |
| 2009/0077237 A1* | 3/2009 | Brehon | H04L 12/5695 |
| | | | 709/226 |
| 2012/0166618 A1* | 6/2012 | Dahod | H04L 47/20 |
| | | | 709/224 |
| 2014/0233380 A1* | 8/2014 | Kim | H04L 47/24 |
| | | | 370/230 |

OTHER PUBLICATIONS

"European Application Serial No. 13155592.2, Response filed Feb. 11, 2015 to Extended European Search Report mailed Aug. 1, 2013", 62 pgs.

* cited by examiner

TECHNOLOGIES FOR PROCESSING DATA PACKETS IN BATCHES

PRIORITY CLAIM

This patent application claims priority to European Patent Application No. 13155592.2 filed 18 Feb. 2013, the disclosure of which is incorporated herein by reference in its entirety.

FIELD

Disclosed packet data communication network and particularly to processing of data packets on a connection between protocol entities hosted by network nodes in a packet data communication network.

BACKGROUND

Performance requirements of packet networks, like the Internet and latest generations of the mobile phone networks, are rapidly increasing. At the same time, security and other aspects require more operations on the data packets and connections. These operations are performed by firewalls, routers, intrusion prevention systems and other network appliances. The performance of these appliances is often a bottleneck in the overall performance of the packet networks.

Network appliances are either specialized or general purpose computers running appropriate software. Usually, the data packets are received by one network interface, transferred to the main memory, processed by the central processing unit using purpose-built software and transferred to another network interface for further transmission. The performance of the appliance is significantly affected by the efficiency of data transfer between the network interfaces and the main memory and further to the operating system's network stack.

A traditional way to transfer packet data from a network interface to main memory is via an interrupt handler. When a packet is available, an interrupt is raised by the Network Interface Card, NIC, hardware. The operating system will then read the packet from the card buffer. When a lot of packets must be processed, there is a lot of overhead in using this method. Every time a packet is received, the control is moved from whatever the operating system kernel was doing to the device driver managing the NIC, and after the transfer operation, back again. Subsequently, many optimization methods are used and proposed to increase the data packet rate between the network interfaces and the main memory.

In Large Receive Offload, LRO, and Generic Receive Offload, GRO, the NIC driver assembles several received data packets belonging to the same stream Transport Control Protocol, TCP, stream into a single, larger data packet, before passing the assembled data packet to the operating system's network stack.

However, for the network appliances that are operating as intermediary network nodes between hosts operating as endpoints of the communication, combining and then recreating the packets is inefficient.

SUMMARY

Disclosed embodiments provide a method and an apparatus for implementing the method to alleviate at least part of the above problems. Disclosed embodiments are based on the idea of storing received data packets into one or more batches for data packets according to their specific properties. In this way the batches include data packets that require similar processing and the packets may be accessed via the batch, whereby the processing may be applied to the whole batch at a time.

BRIEF DESCRIPTION OF THE DRAWINGS

In the following, the invention will be described in greater detail by means of disclosed embodiments with reference to the attached accompanying drawings, in which.

DETAILED DESCRIPTION OF THE DISCLOSED EMBODIMENTS

At least one disclosed embodiment provides a method comprising defining at least one connection between protocol entities hosted by network nodes in a packet data communication network, receiving data packets including information identifying communicating protocol entities, storing the received data packets, into batches corresponding to the defined connections, on the basis of the information identifying communicating protocol entities.

Another disclosed embodiment provides an apparatus comprising means to perform steps of a method according to an aspect.

Yet another disclosed embodiment provides an apparatus comprising at least one processor, and at least one memory including computer program code, the at least one memory and the computer program code configured to, with the at least one processor, cause the apparatus at least to perform the steps of a method according to an aspect.

Still another disclosed embodiment provides a system comprising one or more apparatuses according to an aspect.

Another disclosed embodiment provides a computer program product comprising executable code that when executed, cause execution of functions of a method according an aspect.

Yet another disclosed embodiment provides a computer program embodied on a non-transitory computer readable storage medium, the computer program being configured to control a processor to perform a method according to an aspect.

Some improvements provided by the disclosed embodiments include reducing overhead involved with accessing memory, when performing operations on data packets, and maintaining packet structure of the data packets that are to be forwarded.

Further improvements will become apparent from the following description.

Figure 1A:
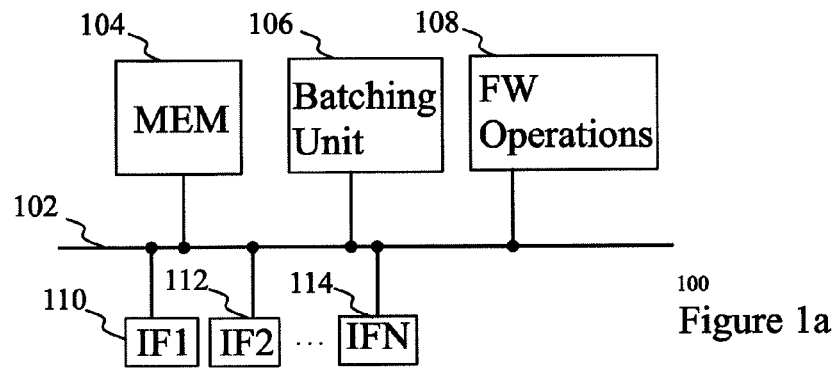
FIG. 1a illustrates an apparatus configured to perform batching of received data packets, according to at least one disclosed embodiment.

FIG. 1a illustrates an apparatus 100 configured to perform batching of received data packets, according to at least one disclosed embodiment. The apparatus comprises a memory 104, a batching unit 106, a FireWall, FW, operations unit 108 and a plurality of network interfaces 110, 112, 114. The units of the apparatus illustrate functional units whose implementation may include a corresponding physical device or the implementation may be distributed among two or more devices, for example a processor and a memory.

Data packets are received to the apparatus via the network interfaces and the received data packets are stored to the memory. The batching unit accesses the received data packets in the memory and forms one or more batches of the received data packets.

A connection between protocol entities hosted by network nodes in a packet data communication network may be defined on the basis of information identifying the communicating protocol entities. The batching unit may form batches by storing the received data packets into batches on the basis of information identifying communicating protocol entities included in the data packets. The batches may correspond to defined connections for processing data packets in the apparatus.

Accordingly, the information identifying communicating protocol entities may be derived from the received data packets. A batch may be formed by storing a batch identifier in association to the data packets that belong to the same batch so as to know which batch they belong to. The batch identifier may be implemented as a memory pointer that points to the data packets of the batch. Also a plurality of memory pointers may be used to point to the data packets, when the data packets are stored in separate memory areas that have separate address spaces. The FW operations unit may access the batches formed by the batching unit in the memory and process the batches according to a set of rules corresponding to a specific defined connection. The processing defined by the rules may be related to firewall access control, firewall connection tracking, packet forwarding e.g. network routing, VPN (Virtual Private Network) operation, NAT (Network Address Translation), Deep Packet Inspection and load balancing decision in a network security device cluster.

In at least one disclosed embodiment, the apparatus may comprise a network appliance operating as an intermediary network node which receives data packets from a source network node and transmits data packets to a destination network node. One example of the apparatus comprises a network firewall.

It should be appreciated that depending on implementation of the apparatus, the FW operations unit may apply also other processing as those described above. Accordingly, the FW operations unit describes generally operations that are performed by a network appliance operating as an intermediary network node which receives data packets from a source network node and transmits data packets to a destination network node. The source and destination network nodes host corresponding source and destination protocol entities that communicate on an end-to-end-connection.

The functional units of the apparatus are interconnected by an electrical connection 102 including one or more electrical conductors. The electrical connection may be provided by a data bus for example Industry Standard Architecture (ISA) or Peripheral Component Interconnect (PCI) bus used in computers. In another example the electrical connection may be provided by a memory, e.g. the memory 104, where each of the functional units can access for reading and/or writing data, whereby data may be exchanged between the functional units via the memory. Accordingly, such a memory is common between the functional units. The access to such a memory may be free, for example both read and write operations of data can be performed by all functional units. In another example the access to such a memory may be limited to a part of the functional units.

In one example of a limited access to a common memory, network interfaces of received and transmitted data packets may be different, whereby a receiving data packet may only have the permission to write to the memory and the transmitting network interface may only have the permission to read the memory.

The network interfaces connect the apparatus to corresponding networks. In this way the apparatus operates as an intermediary node between the connected networks. The network interface to the corresponding network enables the apparatus to communicate data packets to and from the network. In this way the apparatus is reachable in each of the connected networks.

A network interface may be implemented for example by a Network Interface Card (NIC) that provides reading data packets from a physical communications medium that may be wired or wireless. The data packets read from the network by the NIC may be stored into a contiguous or otherwise directly addressable memory area 104. The memory may be a main memory 104 of the apparatus. It should be appreciated that in different embodiments the memory may reside at the NIC, or the memory may comprise a cache memory of a (Central Processing Unit) CPU (not shown) of the apparatus.

Each of the connected networks may employ a network addressing for example provided Internet Protocol (IP) addresses for communicating data packets between network nodes. The apparatus 100 may have a separate network address in each of the connected networks. Accordingly, the address spaces of the connected networks may be different.

The connected networks may have a hierarchical relationship. In one example a connected network may be a Wide Area Network (WAN) connecting to one or more Local Area Networks (LANs) via the apparatus.

The connected networks may employ different protocols below a network level protocol such as IP version 4 or IP version 6 both developed by the Internet Engineering Task Force (IETF). The implementation of the networks on protocol layers below the network layer, e.g. link layer, may include wired or wireless technologies including but not limited to Ethernet, Synchronous Digital Hierarchy (SDH), Synchronous Optical Networking (SONET) and IEEE 802.11 based Wireless Local Area. Network and various cellular communications technologies.

The apparatus may comprise one or more defined connections for communicating data packets received at one network interface to another network interface. Definitions of the connections may be stored in the memory, for example in a connection table. A definition of a connection may comprise information identifying protocol entities hosted by network nodes. In this way, received data packets communicated between the protocol entities that belong to the connection may be identified.

The definition of the connection may include a set of one or more rules to be applied to the received data packets that belong to the connection. These rules may be related to firewall access control, firewall connection tracking, packet forwarding e.g. network routing, VPN (Virtual Private Network) operation, NAT (Network Address Translation), Deep Packet Inspection and load balancing decision in a network security device cluster.

Received data packets may be processed in the apparatus according to a set of rules defined for a specific connection. In an example, when the processing of the received data packets comprises forwarding of the packets, the set of rules may define a rule to be applied to a specific connection for the forwarding. Accordingly, the rule to be applied may define that the received data packets, which belong to the specific connection, are forwarded through the correct network interface towards the destination network node. In another example, the processing of the received data packets comprises rules related to firewall access control. Then, the rule may include allowed source and destination network addresses and ports, and one or more operations to be performed for received data packets that are allowed.

Figure 1B:
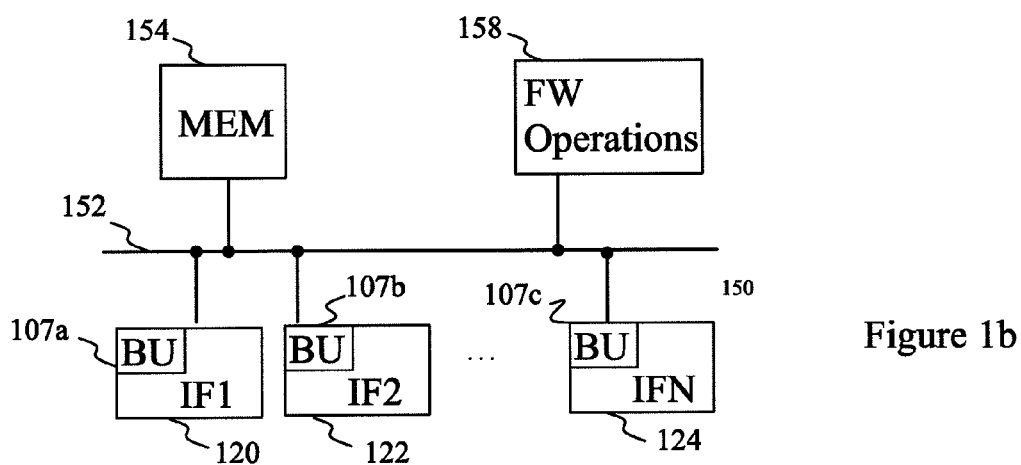
FIG. 1b illustrates an apparatus comprising one or more network interfaces capable of batching received data packets, according to at least one disclosed embodiment.

FIG. 1b illustrates an apparatus 150 comprising one or more network interfaces 120, 122, 124 capable of batching received data packets, according to at least one disclosed embodiment. The apparatus comprises a memory 154, a firewall operations unit 158 and an electrical connection 152 interconnecting the units. The memory 154 and firewall operations, FW operations unit 154 and electrical connection 152 may correspond to those of FIG. 1a.

Referring to FIG. 1b, the apparatus 150 comprises network interfaces 120, 122, 124 that correspond to the network interfaces 110, 112, 114 of the apparatus 100 of FIG. 1a with the difference that the network interfaces 120, 122, and 124 include batching units 107a, 107b, 107c that configure data packets received at the network interface into one or more batches. Accordingly, since the batching is performed in the apparatus of FIG. 1b at the network interfaces, no separate batching unit is needed. In this way the data packets received at the network interfaces are readily provided in batches at the network interfaces. The received data packets may in this way be directly stored in batches to the memory of the apparatus, without a need for a separate execution of batching of received data packets stored to the memory. Since the received packets in the memory 154 are ready to be processed in batches by the FW operations after being stored to the memory from the network interfaces, the number of memory accesses may be kept low.

A hardware implementation of a NIC implementing a network interface 120, 122, 124 of the apparatus of FIG. 1b, may perform batching using its own hardware. This would reduce the amount of processing required by a CPU of the apparatus hosting the NIC. It should be appreciated that a network interface may also be implemented by a combination of hardware and software, whereby one or more functionalities of the network interface may be provide by a computer program executed by the network interface. For this purpose the network interface may include a processing unit and memory storing a computer program code comprising instructions for implementing the functionality, when executed by the processing unit.

Figure 2:
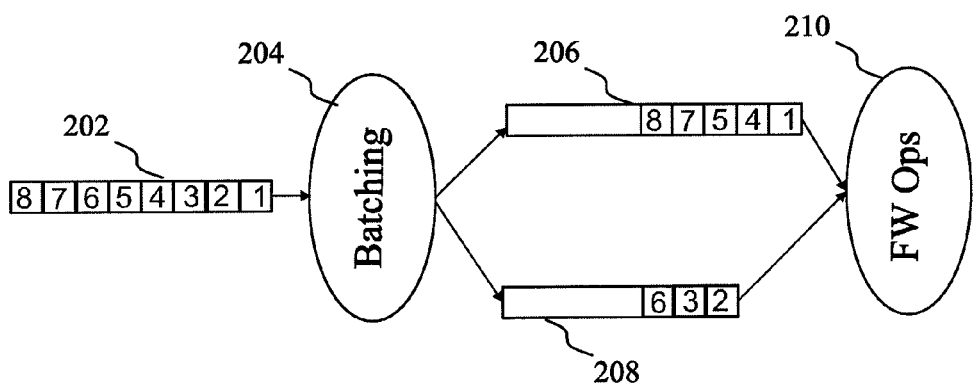
FIG. 2 illustrates processing of received packets by functional units of an apparatus according to at least one disclosed embodiment.

FIG. 2 illustrates a process of batching received packets according to at least one disclosed embodiment. In the FIG. 2, the process is illustrated by using the functional units described above with FIGS. 1a and 1b. The functional units include a batching unit 204, a FW operations unit 210. Batches 206, 208 may correspond to those described above with FIGS. 1a and 1b. The received packets 1, 2, 3, 4, 5, 6, 7 and 8 may be provided by a network interface as described above with FIGS. 1a and 1b.

When the process of FIG. 2 is implemented into the apparatus of FIG. 1a, the process may be performed by the batching unit 106 that is a central batching unit common to all the network interfaces. When the process of FIG. 2 is implemented into the apparatus of FIG. 1b, the process may be performed each of the batching units 120, 122, 124 of the network interfaces, i.e. the batching is performed in a distributed manner. In the distributed implementation of FIG. 1b, the batching does not load a central processing unit that may be used to implement the functionality of the units of the apparatus, e.g. the FW operations.

In the process of FIG. 2, the received packets are assigned to the batches 206, 208 according to one or more defined connections so that packets associated with the same connection are assigned to the same batch. The connection may be pre-defined or they may be defined by the received packets. Accordingly, the batching unit may determine that a received packet is associated with a defined connection. This may include matching of information that identifies communicating protocol entities derived from the received data packet with information defining the connection. The information defining the connection may comprise information identifying the protocol entities communicating on the connection. When the received data packet belongs to the defined connection, the received packet may be assigned to a batch corresponding to that connection. If there is no batch for the defined connection, the batch may be generated by the batching unit, for example by allocating memory for a batch identifier and/or the received packet.

A connection, e.g. stream or flow, may be defined by identifying communicating protocol entities hosted by network nodes. A network node may host one or more entities of the same protocol. A protocol entity may be defined by one or more or a combination of: a source network layer protocol address, a destination network layer protocol address, a source protocol entity above the network layer protocol and a destination protocol entity above the network layer protocol. The network layer protocol may be a protocol providing routing of data packets from a source to a destination connected the same or separate networks. Typically IP versions 4 or 6 are used as the network layer protocol, however also other protocols may be used including also proprietary solutions for addressing nodes in a network.

In one example a protocol entity may comprise an entity of transport protocol layer protocol, for example a User Datagram Protocol (UDP) protocol. A network node may host an UDP protocol entity by an operating system of the network node supporting the UDP protocol, for example in a network protocol stack of the operating system, as conventional. The protocol stack may further include IP and Ethernet protocols below the UDP as is typical in packet data communications. Accordingly, the UDP protocol entity hosted by the network node may be identified by a source network node IP address and a destination network node IP address and a source UDP port and a destination UDP port.

The defined connections may be arranged in a table stored in a memory, where the table can be accessed for checking and updating the table. A protocol entity terminates the data packets communicated between the network nodes. Accordingly, the defined connections may be end-to-end connections. In a network node the communicating protocol entities above the network layer protocol may be identified by ports, e.g. a Transport Control Protocol (TCP) port, UDP port, or other identifiers, such as a stream identifier.

The defined connection may be a connection on a transport protocol layer protocol or on an application protocol layer. The transport protocol layer may include protocols including but not limited to: Transport Control Protocol (TCP), User Datagram Protocol (UDP), Datagram Congestion Control Protocol (DCCP), Stream Control Transmission Protocol (SCTP), Resource Reservation Protocol (RSVP). The application layer protocols include but are not limited to Dynamic Host Configuration Protocol (DHCP), Domain Name System (DNS), File Transfer Protocol (FTP), Hypertext Transfer Protocol (HTTP), Internet Message Access Protocol (IMAP), Internet Relay Chat (IRC). Accordingly, the connection may be defined by identifying entities of one of the above protocols which communicate by data packets.

A connection between protocol entities hosted by network nodes in a packet data communication network may be defined for example on the basis of received data packets. In one example, a connection between TCP protocol entities may be defined by a TCP handshake which precedes the TCP connection and is handled packet by packet. Before the TCP handshake is completed, the TCP connection cannot proceed. During the TCP handshake, three associated packets are passed in alternate directions between the network nodes. Each of the packets may be separately matched against a rulebase, and if the IP addresses and the destination port are acceptable, the connection may be added to a connection table. This packet by packet processing may be performed in a conventional manner and is, therefore, not described herein in more detail. After the TCP handshake, the TCP connection has been defined in the connection table and a higher volume of packets can flow in either direction between the communicating network nodes. A connection may be defined differently for different protocols. In addition to the example of defining the TCP connection above, also other methods to define a connection may be used. For example, the connections may be user defined connections or some or all of the connections may be hardcoded into the hardware.

In 202, the batching unit receives data packets from a network interface. The network interface may be any of the network interfaces in FIGS. 1a to 1b as explained above. In the illustration of FIG. 2, the 8 data packets 1, 2, 3, 4, 5, 6, 7 and 8 are received to the batching units. It should be appreciated that the number of received data packets may be any number of received data packets, but 8 data packets is only used to illustrate forming of batches according to at least one disclosed embodiment.

The batching unit processes each of the received data packets into a batch of data packets associated with the same defined connection as the received data packet. In this way the received data packets belonging to the same connection may be configured into the same batch and further operations may be performed to batches of packets rather than single packets.

The processing of the received packets may be performed for one data packet at a time or several data packets may be processed at a time, i.e. parallel processing may be employed. The parallel processing may be provided by the batching unit being implemented by using a multi-core processor, whereby batching of two or more packets can be performed simultaneously. In one example of employing a higher number of processor cores provide increased performance. For example, dual-core processor may need more clock cycles to process the data packets 202 than a quad-core processor.

In the illustration of FIG. 2, the received data packets are configured into two batches 206 and 208. The number of batches may be determined by a memory space available to store the batches. Accordingly, the memory space may limit the number of batches and the sizes of the batches. The size of the batch may be determined by the number of packets in a batch. The batches may be stored in a main memory of the apparatus, e.g. memories 104, 154 in FIGS. 1a and 1b.

In at least one disclosed embodiment, the number of batches corresponds to a number of connections defined at the apparatus for communicating data between network nodes. The connections may comprise flows or streams that require similar handing of the associated data packets. A connection may be identified by the communicating protocol entities over the connection. Since a network node may communicate with one or more other network nodes on a plurality of connections, a network layer address of the source network node with a network layer address of the destination network node may not provide sufficient information to a network appliance e.g. a firewall to determine which connections should be allowed or not. However, when the network layer address information is combined with information identifying an association between upper layer protocol entities of a source network node and a destination network node, identification of connections between the source and destination network nodes is improved.

In one example, communicating protocol entities, for example a source and/or a destination protocol entity, above a network protocol layer may be identified by a corresponding identifier within a data packet. The received data packet may include a source and/or a destination identifier of a protocol entity above a network protocol layer. For example, Real Time Transport Protocol (RTP) data packets include 32 bit Synchronization Source identifier (SSRC) that uniquely identifies the source of a stream in an RTP session between network nodes.

In another example, the communicating protocol entities may be identified by identifiers provided by an IPSec protocol, for example Encapsulating Security Payload, ESP, and/or Authentication Headers, AH, protocol. The ESP and the AH both include a Security Parameters Index, SPI, that is used together with the destination IP address to identify the security association of the receiving party.

In the illustration of FIG. 2, the batches 206, 208 are illustrated by corresponding memory areas, where the batch 206 stores the data packets 8, 7, 5, 4 and 1 and the batch 208 stores the data packets 6, 3 and 2. Accordingly, the data packets 8, 7, 5, 4 and 1 have been identified by the batching unit as belonging to the same connection and the data packets 6, 3, and 2 have been identified by the batching unit as belonging to the same connection. The batch 206 is configured for the connection of packets 8, 7, 5, 4 and 1. The batch 208 is configured for the connection of packets 6, 3, and 2.

In at least one disclosed embodiment, the apparatus maintains batches comprising a set of batches corresponding to defined connections and another set of batches without a corresponding defined connection. The maintaining may comprise generation of one or more new batches and discarding the batches once the batch has been processed, e.g. by forwarding the data packets of the batch. In generating a batch, data packets may be stored to the batch until a specified limit. This limit may be specified by a number of data packets, a memory consumed by the batch and/or a time limit for storing a data packet in the batch. Once the limit is reached, the batch may be processed by the apparatus, e.g. by the FW operations unit. The time limit facilitates starting the processing of the batch in time, while the limits regarding the number of data packets and memory consumption facilitate memory management within the apparatus, thereby allowing the memory to be used also for other purposes than the batching.

The sets of batches may include one, two, three, . . . , N, or any number of batches. In the illustration of FIG. 2, one of the batches may be included in the set of batches corresponding to defined connections and the other of the batches may be included in the set of batches without a corresponding defined connection. Thus, in the illustration of FIG. 2, the both sets have one batch.

In one example, the batch 206 may correspond to a defined connection, e.g. TCP connection defined by a source IP address and a source TCP port, and a destination IP address and TCP port, or a source and a destination IP address and an RTP SSRC. Also other protocols identified above may be used. Then, the batch 208 may be used for all the packets not belonging to the defined connection corresponding to the batch 206. This batch 208 may be referred as a batch for Miscellaneous packets, a Misc batch. Accordingly, the received packets 8, 7, 5, 4, 1 are determined in the batching unit 204 to belong to the defined connection, e.g. TCP or RTP, and the packets are stored in the batch 206 corresponding to the defined connection. The rest of the received data packets are determined not to belong to the same connection as the data packets in batch 206. Thereby the other received packets are stored into the batch 208 that does not have a specific associated connection but may include data packets of a plurality of connections.

The maintaining of the batches may comprise identifying packets belonging to a specific batch, for example to a batch corresponding to a defined connection or to a Misc batch. A batch may be defined by information defining the connection corresponding to the batch. The data packets belonging to the batch may be determined on the basis of matching information identifying communicating protocol entities derived from the data packets to the information defining the connection corresponding to the batch.

In at least one disclosed embodiment, a batch may be generated by assigning a batch identifier to a received data packet for identifying the data packet to belong to a particular batch, for example a batch corresponding to a defined connection or a batch without a defined connection, such as the batches 206 and 208 illustrated in FIG. 2. In the example of the apparatus of FIG. 1a, the batching unit may assign batch identifiers to received data packets that are transferred from the network interface to the memory. In the example of the apparatus of FIG. 1b, the batching unit of each network interface assigns the batch identifiers to the data packet and transfers the data packets that are now furnished with batch identifiers to the memory of the apparatus.

A batch identifier may comprise information about selection criteria of the packets to the batch. The information about selection criteria may include information identifying communicating protocol entities hosted by network nodes. Examples of this information comprise a source IP address, a source TCP port, a destination IP address, a destination TCP port, encryption information, application layer identifier, stream identifier and a combination of one or more of the previous.

Information identifying a batch may comprise one or more memory pointers. A single memory pointer may be sufficient, when the packets in a batch are stored into a continuous memory space, whereby the single memory pointer may indicate the first packet in the batch. When more than one memory pointers are used, each of them may point to one or more packets. Thereby, the use of more than one memory pointer provides identifying a batch stored in a memory in memory areas that are separated from each other, whereby their address spaces are also separate. Accordingly, in one example, the memory pointers may be provided as a list of memory pointers, one to each of the packets belonging to the batch.

In at least one disclosed embodiment, where batch identifiers are assigned to receive data packets, the batch identifier may be included in the information identifying a specific batch.

Information identifying a batch may be used in further processing of the received packets following the forming of batches by the batching unit, for example in the FW operations 210, to point to the actual packet data. As a network appliance forwarding packets is making most of its programmed decisions on connections, not individual packets, most of them can be made once for each batch. This is a much smaller task than making the decisions on each packet while the parameters affecting the decisions stay the same over the whole connection.

The FW operations 210 processes the received data packets in batches. The received data packets may be passed on from the batching unit to the FW operations by providing the FW operations with information identifying the hatches, e.g. memory pointers to the batches. This may be performed by the information identifying the batches being stored in a memory accessible to the FW operations and/or by the batching unit sending the information to the FW operations.

In at least one disclosed embodiment, batches are stored to a specific memory area in a memory of an apparatus according to at least one disclosed embodiment. The memory area may be a single memory area or a combination of separate memory areas that have separate address spaces.

The FW operations may process the batches generated by the batching unit, which have a corresponding defined connection, according to a set of rules defined for the connection. The rules to be applied by the FW operations in processing a specific batch may be determined by matching the information identifying the batch with the set of rules to determine the matching rule. In this way the rules for the connection may be applied to the batch and all the data packets of the batch at a time. Since the whole batch is processed instead of single data packets, the number of memory accesses to read the data packets from the memory may be kept low for processing the data packets. This enables saving time in retrieving the data packets for processing since only one memory access may be needed to retrieve the data packets to be processed. Moreover, when the processing comprises Network Address Translation (NAT), where e.g. the destination address of received data packets is changed to another address, the rule for the change of the address may be executed only once, whereby all the destination and/or source addresses are changed. In one example the FW operations may apply a forwarding decision to the batch having a defined connection. Then, all the data packets in the batch are forwarded using the same rule.

When a batch does not have a defined connection, i.e. the batch is a Misc batch, the FW operations may process the batch by a default processing common to all connections that are not defined.

In one example the FW operations may apply a forwarding decision to all the packets in the Misc batch. Then, all the data packets may be forwarded according to individual rules that may be determined by the information derived from a specific packet, for example information identifying the communicating protocol entities of the data packet. As the forwarding decision is done, the FW operations may perform a look up in a routing table to find the correct destination network interface. Also this decision is done only once for the whole batch. It should be appreciated that there may be also other operations that may, similarly to the forwarding decision of data packets, be performed for one batch at a time, i.e. batch-wise, thereby providing increased efficiency compared to implementations that operate on each packet at a time, i.e. on a packet-by-packet basis. These batch-wise operations include firewall access control, firewall connection tracking, packet forwarding e.g. network routing, VPN (Virtual Private Network) operation, NAT (Network Address Translation), Deep Packet Inspection and load balancing decision in a network security device cluster. Modifications to the packet headers, where these are required, may be performed on each packet, but even in these cases, the decisions regarding what the modifications are can be made on the batches.

In at least one disclosed embodiment, the process of FIG. 2 may be executed by a firewall deployed in a packet data communications network. In a firewall a typical processing applied to packets belonging to the same connection includes access control enforcement. Another typical example is allowing or rejecting TCP connections on the basis of a rulebase, the practical embodiment of the security policy configured into the firewall. The decision to allow the connection is done using the source and destination IP addresses and the destination TCP port.

Figure 3:
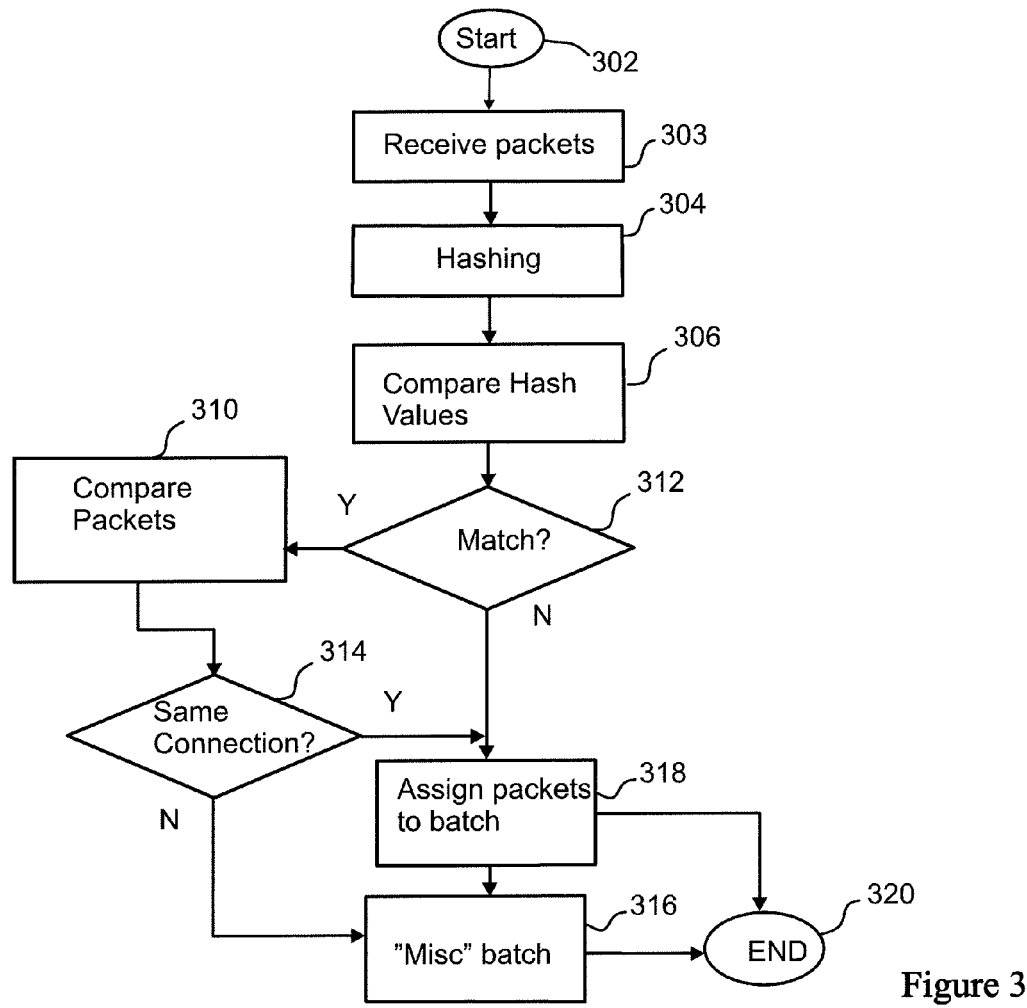
FIG. 3 illustrates a process of batching received packets according to at least one disclosed embodiment.

FIG. 3 illustrates a process of batching received packets according to at least one disclosed embodiment. The process starts 302, when an apparatus, for example a network appliance is connected to a network via a network interface such as a network interface provided by a NIC. FIGS. 1a and 1b illustrate examples of apparatus suitable for carrying out the process of FIG. 3.

In the illustrated process information identifying a batch comprises a hash value. The hash value may be obtained by executing a hash algorithm over a received packet. A batch is then formed by the packets that have the same hash value. It should be appreciated that the process may be executed also using other information than hash values for identifying packets and forming the batches of the packets that need similar processing. The batches used in the process may be generated on the basis of the hash values calculated over the received packets. In one example, if a batch matching a hash value of the received packet does not exist, the batch is generated by the received packet being the first packet in the batch.

In 303, data packets are received from the network. The data packets may be IP packets carrying data communicated between higher layer protocol entities, for example transport layer protocols or application layer protocols. The data packets may be stored into a memory of the apparatus.

In 304 a hash algorithm is executed over the received data packets. The hash algorithm provides a hash value calculated over each data packet. The hash value may be calculated from a subset or all of the information carried in a data packet and used to identify a connection between network nodes, e.g. between protocol entities hosted by the network nodes. The connection may comprise a transport layer protocol connection, an application layer protocol connection, stream and/or flow. In this way, data packets may be identified as being related to a specific connection. Using a subset of the information provides a more coarse identification of the data packets, however, in less time than if an exact identification of the data packets would be performed using more information.

In at least one disclosed embodiment, the received data packets are hashed by a Receive Side Scaling (RSS) performed in a NIC, such as in NICs manufactured by Intel that provide the RSS. In RSS, data packets are distributed among processor cores in a multi-core processor CPU.

In 306 hash values of received data packets are compared. When the memory stores one or more previously received data packets that have been configured into batches, the hash values obtained in 304 are compared 306 to hash values calculated for the previously received data packets. These previously received data packets may comprise data packets that are transferred from the network interface to the memory previously and that are associated with a hash value calculated by the hash algorithm. In this way, it may be determined, whether there exist hash values obtained in 304 that match with the previously calculated hash values.

If a matching hash value is determined in 312, the information carried in the data packets that identify the connection of the data packet may be compared 310 in more detail. This information may include one or more of: source network layer protocol address, destination network layer protocol address, source protocol entity above the network layer and a destination protocol entity above the network layer. In an example, when a data packet comprises an UDP packet, the communicating protocol entities are UDP protocol entities of the source and the destination network nodes. An UDP protocol entity of a network node may be identified by a combination of a source UDP port and a destination UDP port and a network layer protocol address of the source network node and a network layer protocol address of the destination network node. Accordingly, information that was not used in the hashing in 304 may be derived from the received data packets to compare the received data packets with previously received data packets in more detail. Consequently, it may be determined 314 whether the current received data packets are associated with the same connection as the previously received data packets.

When the current and previously received data packets belong to the same connection, the process continues from 314 to 318 to assign the one or more new data packets received in 303 to the same batch with the previously received data packets identified to belong to the same connection in 314. The generation of the batch may be performed as described earlier, for example with batching unit 204 in FIG. 2. The hash value calculated in 304 may be used as a batch identifier that is associated with the data packets in the same batch.

When a matching hash value is not determined in 312, the received data packets are assigned 318 to a new batch. The new batch may be generated as described above, for example with FIG. 2 and batching unit 204.

When the data packets do not belong to the same, but different, connections, the process proceeds from 314 to assigning 316 the received data packets to a Misc batch. The data packets in the Misc batch may belong to a plurality of connections that may be defined connections or undefined connections.

Employing hashing in identifying data packets that belong to the same connection provides identifying a received data packet to belong to a particular connection quickly. As a particular benefit of employing hashing is that as conventional with hash algorithms, it provides a result in a linear time. The time spent on identifying data packets and associated connections may be decreased by using less information from a data packet as input to the hashing.

A practical embodiment is now described with reference to both FIGS. 2 and 3. A large number of batches 206, 208 can be generated 204 for each read 303 operation of data packets 202 from a network interface to the memory. If no existing batch matches 312 the new packets read from the network interface, a new batch may be generated 318. If the number of connections is high, the number of batches can be limited. In such a case, when a limit for the number of batches is reached, the packets not belonging to any existing batch can be stored to a Misc batch 316, 208 for packet-by-packet processing. As the number of connections rises compared to the data rate and network latency, it is advantageous to reduce the average size of a batch to keep delays between the forming of a batch and the processing of the formed batch low. Accordingly, very small batches may not bring significant performance benefits, for example if compared to packet combining in LRO or GRO. Consequently, to gain performance benefits, a batch should have of more than.

In disclosed embodiments, where hashing is used to identify data packets needing similar processing, e.g. being related to a specific connection and a batch, a fast matching process between received packets and batches is provided. In this way a large number of data packets may be a stored into a batch in a short time and data packets are not related to a defined connection may be stored to the Misc batch for packet-by-packet processing.

In at least one disclosed embodiment batching of data packets may be performed in phases. In one example, in the process of FIG. 3 steps 304, 306 and 312 illustrate a first phase of batching and the steps of 310, 314, 316 and 318 illustrate the second phase of the batching. In the first phase, it may be coarsely determined, whether a received data packet may be related to an existing batch that corresponds to a defined connection. In the second phase, it may be determined in more detail than in the first phase, whether the received packet determined in the first phase to be possibly related to an existing batch, belongs to the batch. If the received packet is determined 314 in the second phase to belong to the batch the received data packet is stored 318 to the batch and the process may end 320. However, if the received data packet is determined in the second phase not to belong to the batch, the received data packet may be stored in to a Misc batch 316, after which the process ends 320.

If the coarse determination in the first phase shows that the received data packet is not related to an existing batch, the received data packet may be assigned to a new batch that is generated 318. However, it should be appreciated that the received packet may also be assigned to a Misc batch, where the received packet is processed individually. In this way, generation of new batches may be controlled to maintain a high performance in the processing of the received data packets in batches.

The coarse determination in the first phase may use a subset of the information used in the second phase of the batching. This information may comprise information derived from a received data packet and the information may comprise information identifying a connection between protocol entities hosted by network nodes in a packet data communication network. The deriving of the information is explained in more detail in step 506 in FIG. 5.

Accordingly, the first phase of the batching performs preliminary filtering to the received data packet and a more detailed inspection of the received data packet may be performed only if the coarse determination could not rule out the possibility that the received data packet is related to an existing batch. In this way, the resources needed to execute the batching process may be kept low even with high number of data packets.

In at least one disclosed embodiment hashing is used to implement the batching in several phases, as described above. Then a hash algorithm may be used to calculate a hash value as explained in step 304 of FIG. 3. In the first phase, a subset of information identifying the connection may be fed as input to the hash algorithm and in the second phase all the information identifying the connection may be fed to the hash algorithm to obtain a hash value. Accordingly, the first phase performs preliminary filtering to the received data packets for the following phase of the batching.

In at least one disclosed embodiment, the batching in phases may be implemented by a first phase of the batching being performed in a network interface, e.g. NIC, of an apparatus, and the second phase of batching being performed by a batching unit operating on received data packets transferred from the network interface to a main memory of the apparatus. Accordingly, a received data packet is batched in the first phase by a batching unit at the network interface, e.g. item 107a, 107b, 107c of FIG. 1b, and as a result the received data packets is stored to a Misc batch or a new batch in the main memory. The received data packets by the network interface that are not batched in the first phase are transferred to the main memory. This may be performed as described with FIG. 1a.

Then, in the second phase of the batching, the received data packets that have not yet been stored into batches may be processed by a batching unit that accesses the main memory to batch data packets transferred from the network interfaces to the main memory. This batching unit may correspond with the batching unit 106 of FIG. 1a.

Accordingly, in the disclosed embodiment where received data packets are stored in to batches in phases, the phases are executed in sequence. The batching units 107a, 107b and 107c of FIG. 1b may perform the first phase of batching and a common batching unit, for example item 106 in FIG. 1a, may perform the second phase of the batching. The first phase of batching may be implemented using RSS and by using commercially available products, for example by Intel, which implement the RSS.

It should be appreciated that, where in the above disclosed embodiments batching of data packets is described by referring to a plurality of data packets, also a single data packet received at a time may be stored into a batch.

When a hash value obtained in a first phase does not match to hash values identifying batches of previously received data packets, received data packets may be assigned to a new batch or to a Misc batch. When a new batch is formed, a new batch identifier needs to be calculated, e.g. a hash value is calculated with more detailed information than used in the preliminary filtering. However, when a new batch is not formed, for example if a limit for the number of batches has been reached, the received packets may be assigned to the Misc batch.

It is possible to optimize the number of batches such that on average, they contain a number of packets that is considered efficient. The number of batches may be determined a limit to facilitate the efficient use of the batches. Batches are created with higher probability for connections with multiple packets as those are encountered with higher frequency at the beginning phase, and when the limit for the number of batches is reached, further packets into those batches will be matched to assign them to the existing batches. Single packets having no others with the same identifiers will be efficiently assigned to the Misc batch after the limit for the number of batches has been reached.

Figure 5:
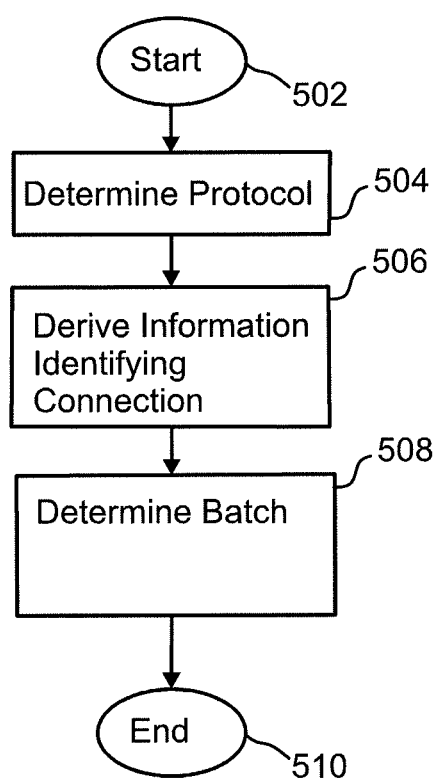
FIG. 5 illustrates identifying connections associated with received data packets according to at least one disclosed embodiment.

FIG. 5 illustrates identifying connections associated with received data packets according to at least one disclosed embodiment. The process may be performed by a batching unit of FIGS. 1a and 2b, for example, when assigning one received data packets to batches. The process of FIG. 5 may be also executed in step 303 of FIG. 3 to provide information to be used in storing the received data packets into batches.

The process of FIG. 5 starts 502, when a data packet is received from a network, for example by a NIC. The received packet is stored into a memory, where it may be further processed and eventually assigned to a batch. The data packet may include a header and payload. In one example, the data packet may be an Ethernet packet including an Ethernet header and payload. The payload may be decoded to obtain Protocol Data Units (PDUs) of upper layer protocols above the Ethernet protocol. The upper layer protocols may include IP, UDP, TCP, Internet Protocol Security (IPsec) and RTP, for example.

In 504, one or more protocols used in the received packet are identified. The protocols may be identified based on field structure of the received packet matching a specific protocol, for example an IP protocol. Accordingly, an IP protocol may be identified on the basis of the first 4 bits of the payload of an Ethernet packet carrying an identifier of IP protocol. The identification may result in identifying a plurality of protocols including but not limited to RTP, UDP, TCP, ESP, AH, IP and Ethernet.

In 506, information identifying a connection between protocol entities hosted by network nodes in a packet data communication network may be derived from the received data packet. The information and the position of the information in the received data packet may vary depending on the protocols used, since different protocols use different field structures. The information identifying a connection may comprise one or more from a group comprising: a source node network address, a destination node network address, an identifier used by an upper layer protocol.

The identifier used by an upper layer protocol entity above a network layer protocol may include a single identifier or more identifiers, for example a source identifier and a destination identifier. Examples of the identifier used by an upper layer protocol comprise an UPD port, TCP port, RTP SSRC, ESP SPI and AH SPI.

In at least one disclosed embodiment, the received data packet may comprise an IPSec protocol, for example the ESP and/or the AH protocol. The AH operates directly on top of IP, using IP protocol number 51 and provides connectionless integrity and data origin authentication of IP packets. The ESP provides origin authenticity, integrity, and confidentiality protection of packets. Both the ESP and the AH include in their header fields, an SPI of 32 bits, that may be used together with the destination IP address to identify the security association of the receiving party. The position of the SPI field in the data packet is different in AH and ESP. For example, in the ESP the SPI is located in the octets 0 to 3, whereas in the AH the SPI is located in the octets 4 to 7.

In at least one disclosed embodiment, the received packet comprises an RTP packet. The RTP header fields include an SSRC identifier that uniquely identifies the source of a stream. The SSRC is a 32 bit field from bits 64 to 95 in the RTP header. In 508, a batch corresponding to the received packet may be determined and the packet may be stored into that batch to be processed, for example by the FW operations unit as described in 108 of FIG. 1a or 158 of 1b. The batch may be determined by matching the information derived in 506 with existing batches, e.g. with information identifying the existing batches. A new batch may be generated if there is no existing batch stored corresponding to the connection of the received packet. However, it may be that a new batch may not be generated, for example due to a limitation in the use of memory and/or a number of batches. Then the received packet may be stored into a Misc batch to be processed on a packet-by-packet basis.

In at least one disclosed embodiment, hash values are used to batch received packets, as described in the process of FIG. 3. Then, the process of FIG. 5 may continue from 508 to step 304. Accordingly, the step 502 to 508 of the process of FIG. 5 may be used to configure the hash function for the received packets, for example in the step 303 of the process of FIG. 3. In this way, the hash may be calculated over specific information, e.g. identifying the connections may include e.g. a source IP address and a destination IP address and a source UDP port and a destination UDP port, used to identify connections between protocol entities of communicating network nodes.

In 510 the received packets associated with connections may be identified and the process ends.

Figure 4:
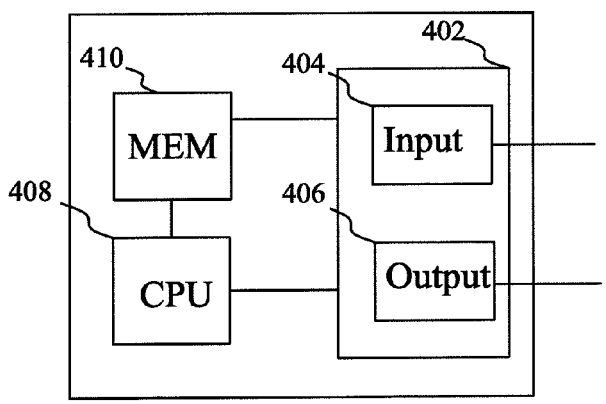
FIG. 4 illustrates an apparatus for carrying out at least one disclosed embodiment.

FIG. 4 illustrates an apparatus for carrying out at least one disclosed embodiment. The apparatus may implement one or more functional units illustrated in FIGS. 1a and 1b. FIG. 4 is a block diagram of the apparatus 400. Although the apparatus has been depicted as one entity, different modules and memory may be implemented in one or more physical or logical entities. The apparatus may be a network appliance operating on packet data, including but not limited to a firewall, a network router, a security gateway and a network appliance performing packet forwarding.

The apparatus 400 comprises an interfacing unit 402, a central processing unit (CPU) 408, and a memory 410, that are all being electrically interconnected. The CPU may comprise a single-core or a multi-core processor. The interfacing unit comprises an input 404 and an output unit 406 that provide, respectively, the input and output interfaces to the apparatus. The input and output units may be configured or arranged to send and receive data packets and/or transmissions according to one or more protocols according to communications standards and/or proprietary communications systems including but not limited to: ISA, PCI, Ethernet, SDH, SONET and IEEE 802.11 based Wireless Local Area Network and various cellular communications technologies and any other suitable standard/non-standard communication means. The memory may comprise one or more applications that are executable by the CPU.

The CPU may comprise a set of registers, an arithmetic logic unit, and a control unit. The control unit is controlled by a sequence of program instructions transferred to the CPU from the memory. The control unit may contain a number of microinstructions for basic operations. The implementation of micro-instructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

Disclosed embodiments provide a computer program embodied on a distribution medium, comprising program instructions which, when loaded into an electronic apparatus, cause the CPU to perform according to at least one disclosed embodiment.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The apparatus 400 may also be implemented as one or more integrated circuits, such as Application-Specific Integrated Circuits (ASICs). Other hardware embodiments are also feasible, such as a circuit built of separate logic components. A hybrid of these different implementations is also feasible. When selecting the method of implementation, a person skilled in the art will consider the requirements set for the size and power consumption of the apparatus 400, necessary processing capacity, production costs, and production volumes, for example.

In at least one disclosed embodiment the input unit may provide circuitry for obtaining data packets and/or transmissions to the apparatus. The obtaining may comprise receiving communications signals from a communications interface, for example from a NIC.

In at least one disclosed embodiment the output unit may provide circuitry for transmitting data packets and/or transmissions from the apparatus. The transmitting may comprise transmitting communications signals on a communications interface, for example on a NIC.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or processor or it may be distributed amongst a number of computers or processors.

The techniques described herein may be implemented by various means so that an apparatus implementing one or more functions described with at least one disclosed embodiment comprises not only prior art means, but also means for defining at least one connection between protocol entities hosted by network nodes in a packet data communication network, receiving data packets including information identifying communicating protocol entities, storing the received data packets, into batches corresponding to the defined connections, on the basis of the information identifying communicating protocol entities.

More precisely, the various means comprise means for implementing functionality of a corresponding apparatus described with at least one disclosed embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The disclosed embodiments are not limited to the examples described above but may vary within the scope of the claims.

The invention claimed is:

1. A method, comprising:
defining, by a compute device, one or more rules to identify at least one connection between protocol entities, wherein each connection is hosted by network nodes in a packet data communication network;
receiving, by the compute device, data packets including information identifying communicating protocol entities;
comparing, by the compute device, the information identifying the communicating protocol entities to the one or more rules to identify each corresponding connection; and
storing, by the compute device, the received data packets into batches corresponding to each identified connection.

2. The method of claim 1, comprising;
processing, by a compute device, at least one batch of received data packets according to a set of processing rules for the corresponding connection, said processing comprising one or more from a group comprising: firewall access control, firewall connection tracking, packet forwarding, Virtual Private Network operation, Network Address Translation, Deep Packet Inspection and load balancing decision in a network security device cluster.

3. The method of claim 1, comprising:
maintaining, by a compute device, batches comprising a first set of batches corresponding to defined connections and a second set of batches without a corresponding defined connection; and
storing, by a compute device, the received data packets associated with a connection without a corresponding batch in the first set of batches, to a batch in the second set of batches.

4. The method of claim 1, comprising:
maintaining, by a compute device, batches comprising a first set of batches corresponding to defined connections and a second set of batches without a corresponding defined connection; and
processing, by a compute device on a packet-by-packet basis, received packets stored in the second set of batches on the basis of a set of rules corresponding to individual connections of the received packets.

5. The method of claim 1, comprising:
deriving, by a compute device, information identifying at least one communicating protocol entity from a received data packet; and
determining, by a compute device, a connection associated with the received data packet on the basis of the derived information including one or more from a group comprising: a source node network address, destination node network address and at least one identifier of an upper layer protocol entity above a network layer protocol providing the network addressing, wherein the at least one identifier includes a destination node port or a source node port.

6. The method of claim 1, wherein the compute device is an intermediary network node, the data packets are received at the intermediary network node from a source network node and transmitted by the intermediary network node to a destination network node, said source and destination network nodes communicating on an end-to-end-connection between a source protocol entity and a destination protocol entity.

7. The method of claim 1, wherein a batch comprises data packets belonging to the same connection and a batch identifier associated with the data packets.

8. The method of claim 1, comprising:
calculating, by the compute device, a hash value on the basis of the information identifying communicating protocol entities of a received data packet; and
storing, by the compute device, the received data packets with the same hash value into the same batch.

9. The method of claim 1, comprising:
maintaining, by the compute device, a plurality of batches of received data packets, wherein at least one of the batches corresponds to a defined connection between protocol entities hosted by network nodes in a packet data communication network;
identifying, by the compute device, a batch corresponding to a defined connection by a first hash value calculated on the basis of a subset of information identifying the defined connection; and
storing, by the compute device, a received data packet to a second batch, when a second hash value calculated on the basis of a subset of information identifying communicating protocol entities of the received data packet, is different than the first hash value.

10. The method of claim 1, comprising:
maintaining, by the compute device, a plurality of batches of received data packets, wherein at least one of the batches corresponds to a defined connection between protocol entities hosted by network nodes in a packet data communication network; and
storing, by the compute device, a received data packet to a batch without a corresponding defined connection, on the basis of the information identifying communicating protocol entities of the received data packet fails to correspond with the defined connection corresponding to the batch.

11. The method of claim 1, comprising:
defining, by the compute device, a limit to a number of batches;
storing, by the compute device, a received data packet to a new batch, when the number of batches is below the limit; and
storing, by the compute device, the received data packet to a batch without a corresponding defined connection, when the limit is met.

12. The method of claim 1, wherein a batch is associated with a limit indicative of at least one of a time limit for storing a data packet in the batch, a memory limit, a limit for the number of data packets in the batch, or their combination, and the batch is processed after the limit is met.

13. The method of claim 1, wherein a connection comprises a connection on at least one of a network protocol layer connection, a transport protocol layer connection or an application protocol layer connection.

14. An apparatus, comprising:
at least one network interface;
a memory coupled to the at least one network interface; and
a batching unit coupled to the memory and to the at least one network interface,
wherein the apparatus is to:
define one or more rules to identify at least one connection between protocol entities, wherein each connection is hosted by network nodes in a packet data communication network;
receive data packets including information identifying communicating protocol entities;
compare the information identifying the communicating protocol entities to the one or more rules to identify each corresponding connection; and
store the received data packets into batches corresponding to each identified connection.

15. The apparatus of claim 14, further comprising a processing unit for processing the batches, wherein the processing unit is configured to:
process at least one batch of received data packets according to a set of processing rules for the corresponding connection, said processing comprising one or more from a group comprising: firewall access control, firewall connection tracking, packet forwarding, Virtual Private Network operation, Network Address Translation, Deep Packet Inspection and load balancing decision in a network security device cluster.

16. The apparatus of claim 14, wherein the apparatus comprises a plurality of network interfaces and the batching unit is a central batching unit common to the network interfaces.

17. The apparatus of claim 14, wherein the apparatus comprises a plurality of network interfaces, each comprising a dedicated batching unit.

18. The apparatus of claim 14, wherein the apparatus comprises a plurality of network interfaces each having a dedicated batching unit, and a central batching unit common to the network interfaces, and the apparatus is to:
store the received data packets into batches in a first phase by the dedicated hatching units; and
store the received data packets that are unallocated to batches in the first phase, into batches in a second phase by the central batching unit.

19. One or more transitory computer readable storage media comprising a plurality of instructions that, when executed, cause a compute device to:
define one or more rules to identify at least one connection between protocol entities, wherein each connection is hosted by network nodes in a packet data communication network;
receive data packets including information identifying communicating protocol entities;
compare the information identifying the communicating protocol entities to the one or more rules to identify each corresponding connection; and
store the received data packets into batches corresponding to each identified connection.

* * * * *

UNITED STATES PATENT AND TRADEMARK OFFICE
CERTIFICATE OF CORRECTION

| | |
|---|---|
| PATENT NO. | : 9,596,300 B2 |
| APPLICATION NO. | : 14/174361 |
| DATED | : March 14, 2017 |
| INVENTOR(S) | : Pekka Riikonen |

It is certified that error appears in the above-identified patent and that said Letters Patent is hereby corrected as shown below:

On the Title Page

In item (30), in "Foreign Application Priority Data", in Column 1, Line 1, delete "13155592" and insert --13155592.2-- therefor In the Specification In Column 4, Line 52, delete "Area." and insert --Area-- therefor In Column 5, Line 24, delete "154" and insert --158-- therefor In Column 6, Line 4, delete "120, 122, 124" and insert --107a, 107b, 107c-- therefor In Column 10, Line 21, delete "hatches," and insert --batches,-- therefor In Column 15, Line 64, before "1b.", insert --FIG.--

In Column 16, Line 10, before "508", insert --step--

In Column 16, Line 51, delete "microinstructions" and insert --micro-instructions-- therefor In the Claims In Column 20, Line 44, in Claim 18, delete "hatching" and insert --batching-- therefor In Column 20, Line 48, in Claim 19, delete "transitory" and insert --non-transitory-- therefor Signed and Sealed this
Twenty-fourth Day of April, 2018

Andrei Iancu
*Director of the United States Patent and Trademark Office*